(12) United States Patent
Christopher et al.

(10) Patent No.: US 8,928,577 B1
(45) Date of Patent: Jan. 6, 2015

(54) METHOD AND APPARATUS FOR SINGLE-STEP USER GENERATED NOTES ON A PERSONAL DIGITAL ASSISTANT

(75) Inventors: David Christopher, San Francisco, CA (US); Carl Stone, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 09/772,449

(22) Filed: Jan. 29, 2001

(51) Int. Cl.
*G09G 5/00* (2006.01)
*G06F 3/00* (2006.01)

(52) U.S. Cl.
USPC .............................. 345/156; 345/169; 715/823

(58) Field of Classification Search
CPC ............................. G06F 3/0488; G06F 15/0266
USPC .......................... 345/184, 810, 890, 156–179;
178/18.01, 18.03, 19.01; 715/209, 210,
715/810, 823, 835, 963
See application file for complete search history.

(56) References Cited

U.S. PATENT DOCUMENTS

| | | | |
|---|---|---|---|
| 5,010,547 A | 4/1991 | Johnson | |
| 5,012,219 A | 4/1991 | Henry | |
| 5,075,684 A | 12/1991 | DeLuca | |
| 5,359,317 A | 10/1994 | Gomez | |
| 5,394,140 A | 2/1995 | Wong | |
| 5,418,903 A * | 5/1995 | Lee | 345/581 |
| 5,430,436 A | 7/1995 | Fennell | |
| 5,457,476 A * | 10/1995 | Jenson | 715/823 |
| 5,590,256 A * | 12/1996 | Tchao et al. | 715/525 |
| 5,600,781 A * | 2/1997 | Root et al. | 345/472.3 |
| 5,612,682 A | 3/1997 | DeLuca | |
| 5,650,776 A | 7/1997 | Mitchell | |
| 5,661,632 A * | 8/1997 | Register | 361/683 |
| 5,705,995 A | 1/1998 | Laflin | |
| 5,739,744 A * | 4/1998 | Roca et al. | 345/169 |
| 5,825,353 A * | 10/1998 | Will | 345/184 |
| 5,845,282 A * | 12/1998 | Alley et al. | 707/10 |
| 5,890,178 A * | 3/1999 | Haneda | 715/203 |
| 5,903,852 A | 5/1999 | Schaupp, Jr. | |
| 5,917,493 A * | 6/1999 | Tan et al. | 715/835 |
| 5,958,006 A | 9/1999 | Eggleston | |
| 6,014,681 A * | 1/2000 | Walker et al. | 715/530 |
| 6,047,260 A * | 4/2000 | Levinson | 705/9 |
| 6,055,552 A * | 4/2000 | Curry | 715/530 |
| 6,157,630 A | 12/2000 | Adler | |
| 6,178,403 B1 * | 1/2001 | Detlef | 704/270 |
| 6,209,011 B1 * | 3/2001 | Vong et al. | 708/112 |

(Continued)

OTHER PUBLICATIONS

"Windows 3.1" Rober Cowart, 1993, pp. 56-57.*

*Primary Examiner* — Regina Liang
(74) *Attorney, Agent, or Firm* — Fulbright & Jaworski LLP

(57) ABSTRACT

A method and system for generating an electronic note on a handheld electronic device. Specifically, the present invention allows a user to push one button on the handheld device to gain access to a cleared screen where ideas, telephone numbers, etc. can be written down directly on the screen in the user's own handwriting in the form of a note. Additionally, the note is automatically time and date stamped. Furthermore, a title associated with the note is displayed concurrently with the note and can be modified using digitized alphanumeric characters. Moreover, the note is automatically stored in the handheld electronic device. Also, an alarm, associated with a particular time and date relative to the electronic device, can be electronically assigned to the note. At the particular time and date associated with the alarm, the alarm is automatically triggered, and the note is automatically displayed on the handheld electronic device.

20 Claims, 13 Drawing Sheets

(56) References Cited

U.S. PATENT DOCUMENTS

| | | | |
|---|---|---|---|
| 6,223,233 B1* | 4/2001 | Kavanaugh et al. | 710/73 |
| 6,243,071 B1* | 6/2001 | Shwarts et al. | 345/823 |
| 6,286,060 B1* | 9/2001 | DiGiorgio et al. | 710/300 |
| 6,326,957 B1* | 12/2001 | Nathan et al. | 345/179 |
| 6,393,848 B2* | 5/2002 | Roh et al. | 236/51 |
| 6,396,481 B1* | 5/2002 | Challa et al. | 345/169 |
| 6,408,092 B1* | 6/2002 | Sites | 345/158 |
| 6,477,117 B1* | 11/2002 | Narayanaswami et al. | 368/251 |
| 6,498,601 B1* | 12/2002 | Gujar et al. | 345/173 |
| 6,504,956 B1* | 1/2003 | Gannage et al. | 382/188 |
| 6,512,525 B1* | 1/2003 | Capps et al. | 345/762 |
| 6,529,911 B1* | 3/2003 | Mielenhausen | 707/100 |
| 6,565,611 B1* | 5/2003 | Wilcox et al. | 715/541 |
| 6,714,222 B1* | 3/2004 | Bjorn et al. | 715/839 |
| 6,788,815 B2* | 9/2004 | Lui et al. | 345/169 |
| 2002/0180622 A1* | 12/2002 | Lui et al. | 341/22 |

* cited by examiner

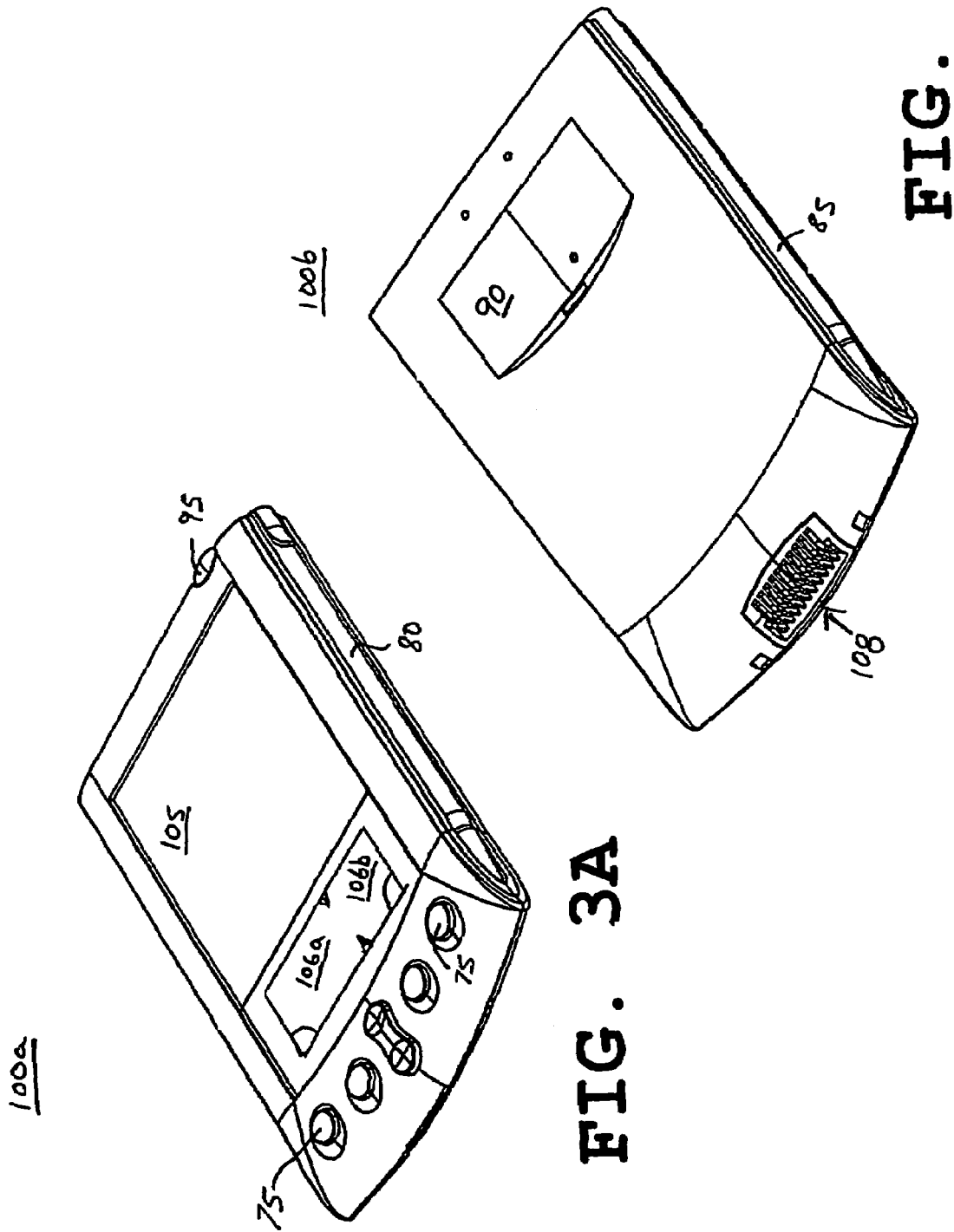

METHOD AND APPARATUS FOR SINGLE-STEP USER GENERATED NOTES ON A PERSONAL DIGITAL ASSISTANT

BACKGROUND OF THE INVENTION

1. Field of the Invention

The present invention relates to the field of generating notes on handheld electronic devices. Specifically, the present invention relates to a method and system for efficiently generating notes on a handheld electronic device.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can therefore be "palm-sized." Most palmtop computer systems are used to implement various personal information management (PIM) applications such as an address book, a daily organizer, scheduling calendar, and electronic notepads, to name a few. Palmtop computers have been known as Personal Digital Assistants (hereinafter referred to as "PDAs").

It has proven convenient to use PDAs as information gathering and organizing tools. It is common for notes to be generated on loose paper, paper stickies, or on pages inside specialized notebooks, such as a daily planner. Notes containing ideas, telephone numbers, doodles, etc. are constantly written down anywhere and at any time. However, sometimes finding a piece of paper, any clean piece of paper, to write down information can be frustrating. Many times, as a last resort, a note taker scrambles to write a note in the margins of a page of telephone listings. The note taker then tears out the note from the page and hopes to retain the note long enough for it to be useful. A handy PDA can greatly enhance the capturing of thoughts in the form of electronic notes. On a PDA, notes can be entered and once written, the note stays with the PDA and can't be lost.

Unfortunately, accessing the note taking application on a PDA in the past has proven complicated and time consuming. To give an example, a user standing at a phone booth has need to write down a telephone number. Contrary to the touted convenience of note taking applications on a PDA in the past and before the user can jot down information, a series of steps needs to be performed on the user's PDA. The more steps needed, the less convenient a note taking application on a PDA becomes for writing notes. FIG. 1 shows a process 25 in the prior art illustrating the steps needed to use a note taking application in a PDA.

In step 26 of FIG. 1, the user must turn on the PDA. In step 27, the user taps the launcher to get to the main menu in order to access the note taking application. If by chance the note taking application is not on the first screen, as is easily the case when the PDA holds a fair number of applications, at step 27 the user must also scroll down through the screens and application icons to reach the note taking application icon. In step 28, the user accesses the note taking application by tapping on the note taking application icon. Once in the note taking application, the last note written pops on the screen. The user then needs to tap "NEW" to access a cleared screen in step 29. Only then can the user begin writing the note in step 30.

However, another hurdle may be presented to the user if the note taking application uses alphanumeric symbol recognition to create the note. Rather than writing a note as in writing on a blank sheet of paper, the user must deliberately enter the correct strokes and symbols which are translated into letters or numbers to create a legible note. Time is added since the processor in the PDA must analyze each stroke and properly translate it. Additionally, if the user is unfamiliar with the strokes, then the user must delete the incorrect symbol and try to recreate the correct symbol. Otherwise the note created may be unlegible. The user who only wanted to write a quick name and phone number is faced with a complex process to create a note that might not even be legible.

Furthermore, initially when the note taking application is opened, the last note written automatically pops up on the screen. Before the user taps "NEW" for a cleared screen, the integrity of the last note may be compromised and be accidentally erased or indiscriminately modified before it is saved.

It has also proven useful to title notes. Titling a note gives the note more importance, as in associating the note with a task, or a quick source of information, or for indexing. The note can be quickly referenced and accessed with proper titling. Unfortunately, many note taking applications summarily assign default titles to the notes, such as number 1 in a string of 20 notes. These default titles give poor identification of the note, especially if there are many notes in the PDA. Furthermore, previous applications only present the default title along with all the other note titles in a list lessening the association between title and note. Thus, a user trying to reference a phone number jotted down on the PDA that only has a default title may have to scroll through all of the notes on the PDA until the note containing the phone number is found.

Other note taking applications allow for retitling of notes. Retitling notes allows for better identification than the default titles since the titles are more personal to the user. However, all of these previous note taking applications inconveniently require a user to open a separate screen to re-title the note. After retitling, the user must go back to the screen to write the note. Also, further modifications to the title require going back to the titling screen. Moreover, these note taking applications only present the retitled title along with all the other note titles in a list, lessening the association between a title and note.

It has also proven useful to attach electronic alarms to notes further increasing the usefulness and the importance of a note written on a PDA. For example, an alarm may be attached to a note written to remind the user to pick up the laundry next week. At the appropriate time, an alarm will be triggered in the PDA alerting the user. Unfortunately, the user might not remember what the alarm is associated with. In order to find out what the alarm means, the user must again go through a series of inconvenient steps to find the note attached to the alarm. Generally, the user must turn the PDA on and search around for the note associated with the alarm. Once found, the user must actively tap on the note to view the note on the display of the PDA.

Thus, a need exists for providing a more efficient means for capturing a thought or generating notes on a handheld electronic device. Also, a need exists for providing a more efficient means for associating titles with notes. A further need exists for more efficient means for alerting a user to a note at a particular date and time.

SUMMARY OF THE INVENTION

The present invention discloses a method and system for capturing thoughts on a handheld electronic device more efficiently. Also, the present invention increases the association between a note and its title. Additionally, the present invention provides for modifying titles more efficiently, and in a more user friendly manner. Further still, the present invention provides for facilitating association between a triggered alarm and the note associated with that alarm.

In one embodiment, the present invention discloses a method and system for single step access to user generated notes on a handheld electronic device. In another embodiment, the present invention provides for simultaneously displaying a note with its title. In a further embodiment, the present invention provides for automatically displaying a note when the note's attached alarm is triggered.

Specifically, one embodiment of the present invention discloses a method and system for allowing a user to select a selector on a handheld electronic device to gain access to a note window that is cleared on a display screen of the electronic device where ideas, telephone numbers, etc. can be written down directly on the window in the user's own handwriting in the form of a note. Additionally, in another embodiment the note is automatically time and date stamped. Furthermore, a title associated with the note is displayed concurrently with the note and can be modified using recognition based alphanumeric characters. Moreover, in another embodiment of the present invention the note is automatically stored in the handheld electronic device. Also, an alarm, associated with a particular time and date relative to the electronic device, can be electronically attached to the note in another embodiment of the present invention. At that particular time and date, the alarm is automatically triggered, and the note is automatically displayed on the handheld electronic device.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

PRIOR ART

FIG. 3A is a top side perspective view of a PDA computer system that can be used as a platform for the data entry and authentication embodiments of the present invention.

FIG. 3B is a bottom side perspective view of the PDA computer system of FIG. 3A.

DETAILED DESCRIPTION OF THE INVENTION

Figure 1:
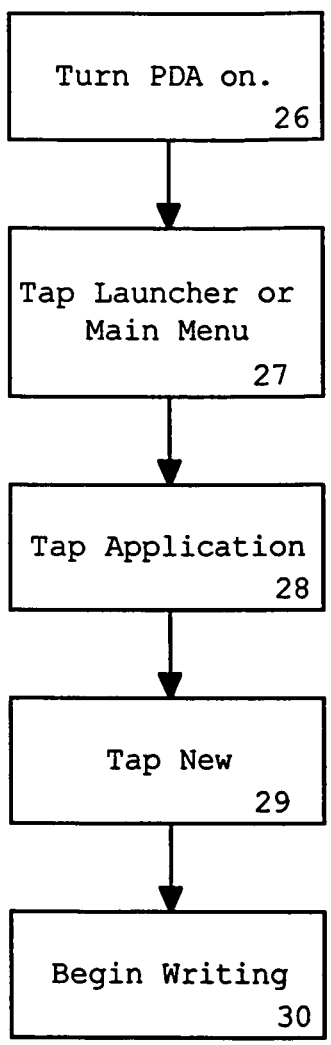
FIG. 1 is a flow diagram illustrating steps in a computer implemented method for accessing a note taking application on a PDA computer system.

Reference will now be made in detail to the preferred embodiments of the present invention, single step access to user generated notes on a handheld electronic device, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the actions and processes of a computer system, or similar electronic computing device, that manipulate and transform data represented as physical (electronic) quantities within the computer system's registers and memories into other data similarly represented as physical quantities within the computer system memories or registers or other such information storage, transmission or display devices.

Exemplary Palmtop Computer System Platform

The present invention is compatible with any electronic device having a screen. One of the common types of electronic systems which can be used in accordance with one embodiment of the present invention is referred to as a personal digital assistant, or commonly called a PDA. The PDA is a pocket sized electronic organizer with the capability to store telephone numbers, addresses, daily appointment, and software that keeps track of business or personal data such as expenses, etc. Furthermore, the PDA also has the ability to connect to a personal computer, enabling the two devices to exchange updated information, that is synchronize the information between the two devices. Additionally, the PDA can also be connected to a modem, enabling it to have electronic mail (e-mail) capabilities over the Internet along with other Internet capabilities. Moreover, an advanced PDA can have Internet capabilities over a wireless communication interface (e.g., radio interface). In particular, the PDA can be used to browse Web pages located on the Internet. The PDA can be coupled to a networking environment. It should be appreciated that embodiments of the present invention are well suited to operate within a wide variety of electronic systems (e.g., computer systems) which can be communicatively coupled to a networking environment, including cellular phones, pagers, etc.

Figure 2A:
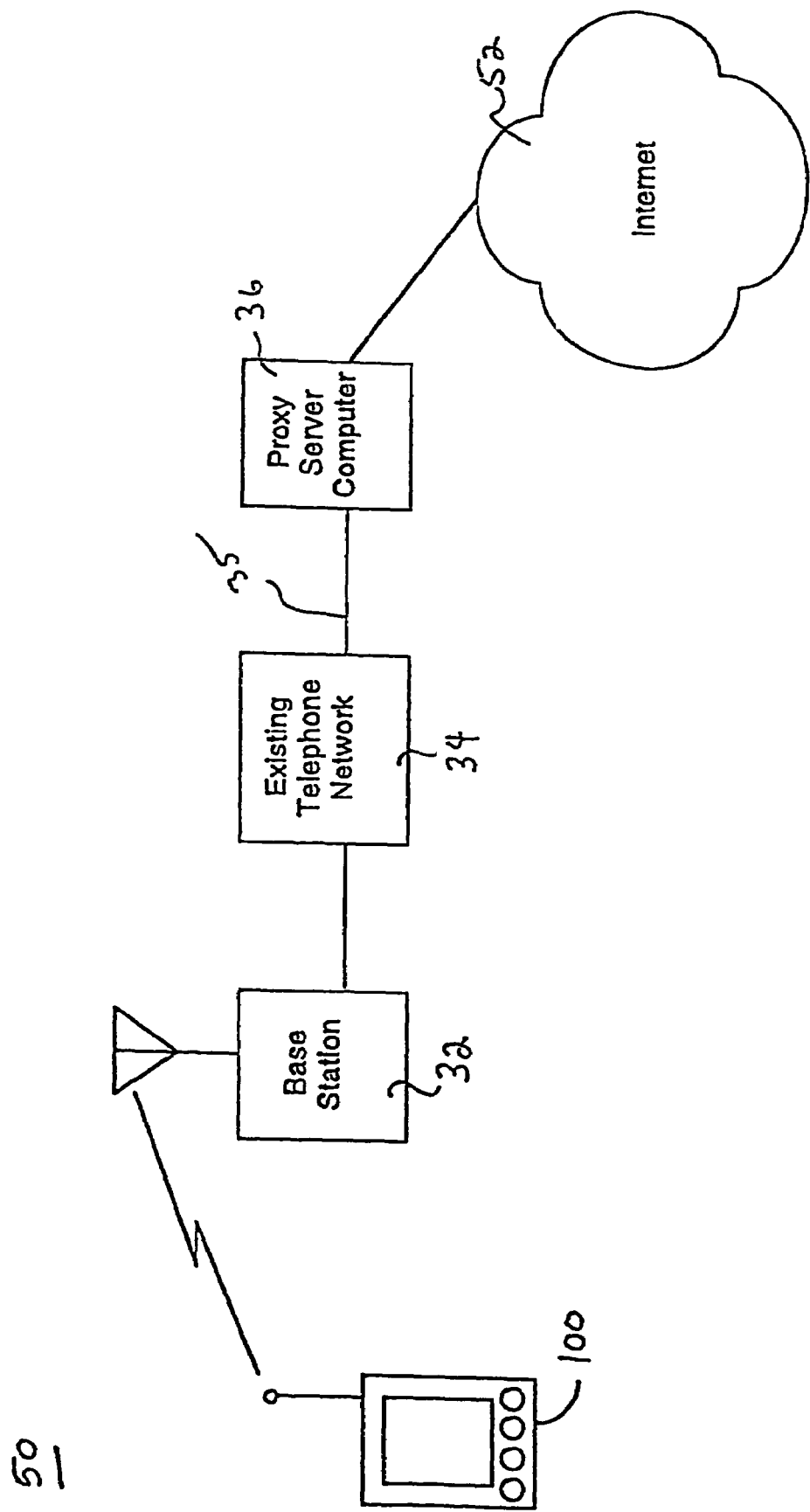
FIG. 2A illustrates a block diagram of a first exemplary network environment including a PDA computer system in accordance with an embodiment of the present invention.

FIG. 2A is a block diagram of an exemplary network environment 50 including an exemplary personal digital assistant. The PDA 100 is also known as a palmtop or palm-sized electronic system or computer system. The PDA 100 has the ability to transmit and receive data and information over a wireless communication interface (e.g., a radio interface). The PDA 100 is one exemplary implementation on which the present invention can operate. The present invention can operate on any portable electronic system or device.

In one embodiment, base station 32 is both a transmitter and receiver base station which can be implemented by coupling it into an existing public telephone network 34. Implemented in this manner, base station 32 enables the personal digital assistant 100 to communicate with a proxy serer computer system 36, which is coupled by wire 35 to the existing public telephone network 34. Furthermore, proxy server computer system 36 is coupled to the Internet 52, thereby enabling the PDA 100 to communicate with the Internet 52. It should be further appreciated that other embodiments of a communications network may be utilized in accordance with the present invention.

The data and information which are communicated between base station 32 and the personal digital assistant 100 are a type of information and data that can conventionally be transferred and received over a public telephone wire network system. However, a wireless communication interface is utilized to communicate data and information between the PDA 100 and base station 32. It should be appreciated that one embodiment of a wireless communication system in accordance with the present invention is the Mobitex wireless communication system.

Figure 2B:
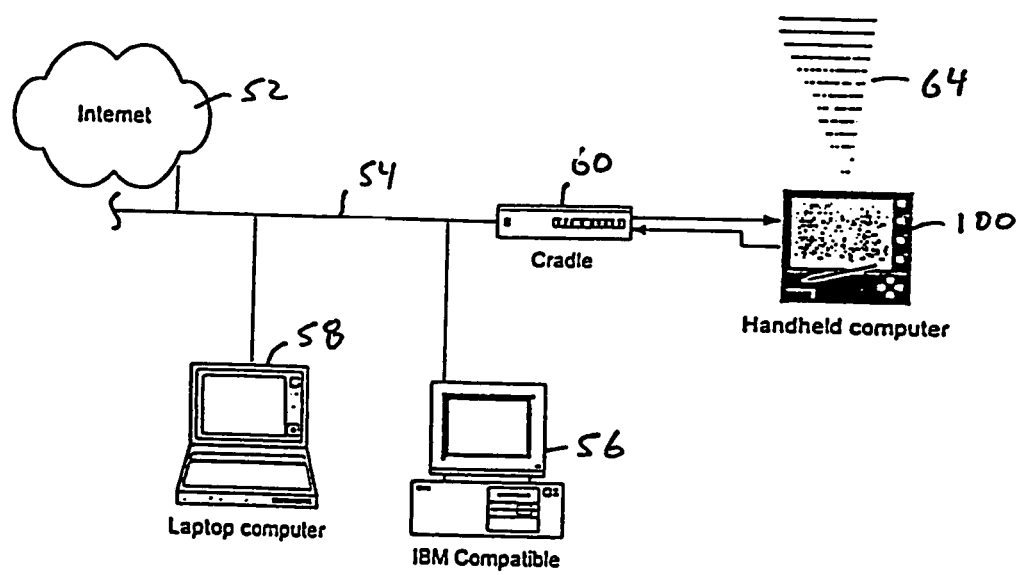
FIG. 2B illustrates a block diagram of a second exemplary network environment including a PDA computer system coupled to other computer systems and the Internet via a cradle device in accordance with an embodiment of the present invention.

FIG. 2B illustrates a system 51 that can be used in conjunction with the present invention. System 51 comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a personal digital assistant 100 in one embodiment of the present invention. Cradle 60 provides an electrical and mechanical communication interface between bus 54 (and anything coupled to bus 54) and the computer system 100 for two way communications. Computer system 100 also contains a wireless infrared communication mechanism 64 (e.g., an infrared emitter and detector device) for sending and receiving information from other similarly equipped devices (see FIG. 2B).

With reference to FIGS. 2A and 2B, it is appreciated that the exemplary personal digital assistant or palmtop computer system 100 can be used in network environment combining elements of networks 50 and 51. That is, as will be seen below, the PDA 100 can include both a wireless infrared communication mechanism and a signal (e.g., radio) receiver/transmitter device.

FIG. 3A is a perspective illustration of the top face 100a of one embodiment of the palmtop computer system. The top face 100a contains a display screen 105 surrounded by a bezel or cover. A removable stylus 80 is also shown. The display screen 105 is a touch screen able to register contact in the form of "digital ink" between the screen and the tip of the stylus 80. For example, display screen 105 can be used for taking handwritten notes in one embodiment of the present invention. In another embodiment, the display area 105 uses a digitizer that is able to register contact in the form of "digital ink" between the screen and the tip of the stylus 80. The stylus 80 can be of any material to make contact with the display screen 105. The top face 100a also contains one or more dedicated and/or programmable buttons 75 for selecting information and causing the computer system to implement functions. The on/off button 95 is also shown.

FIG. 3A also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a or 106b for automatic alphanumeric recognition. The stroke information is then fed to an internal processor for automatic alphanumeric recognition. Once the alphanumeric symbols are recognized, they are typically displayed on the screen for verification and/or modification.

FIG. 3B illustrates the bottom side 100b of one embodiment of the palmtop computer system. An optional extendible antenna 85 is shown and also a battery storage compartment door 90 is shown. A communication interface 108 is also shown. In one embodiment of the present invention, the communication interface 108 is a serial communication port, but could also alternatively be of any of a number of well known communication standards and protocols, e.g., parallel, USB, SCSI, Firewire (IEEE 1394), Ethernet, etc. It is appreciated that interface 108 can also be used for charging current when using rechargeable batteries.

Figure 4:
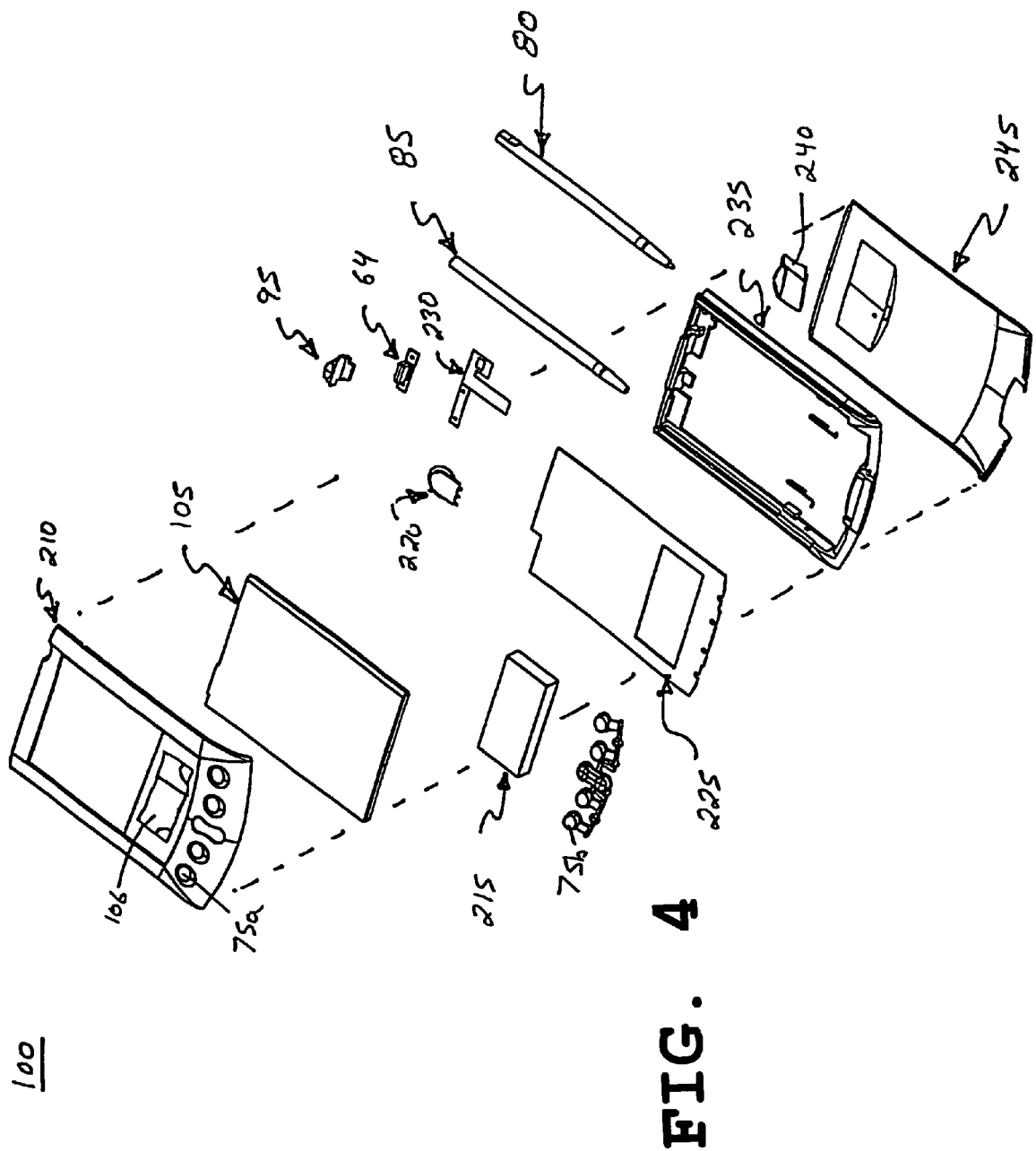
FIG. 4 is an exploded view of the components of the PDA computer system of FIG. 3A.

FIG. 4 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field-emission display (FED), plasma, etc., for the flat panel display screen 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. A digitizer pad can be part of the display assembly or it can also be included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server. In other embodiments, TCP protocol can be used.

Figure 5:
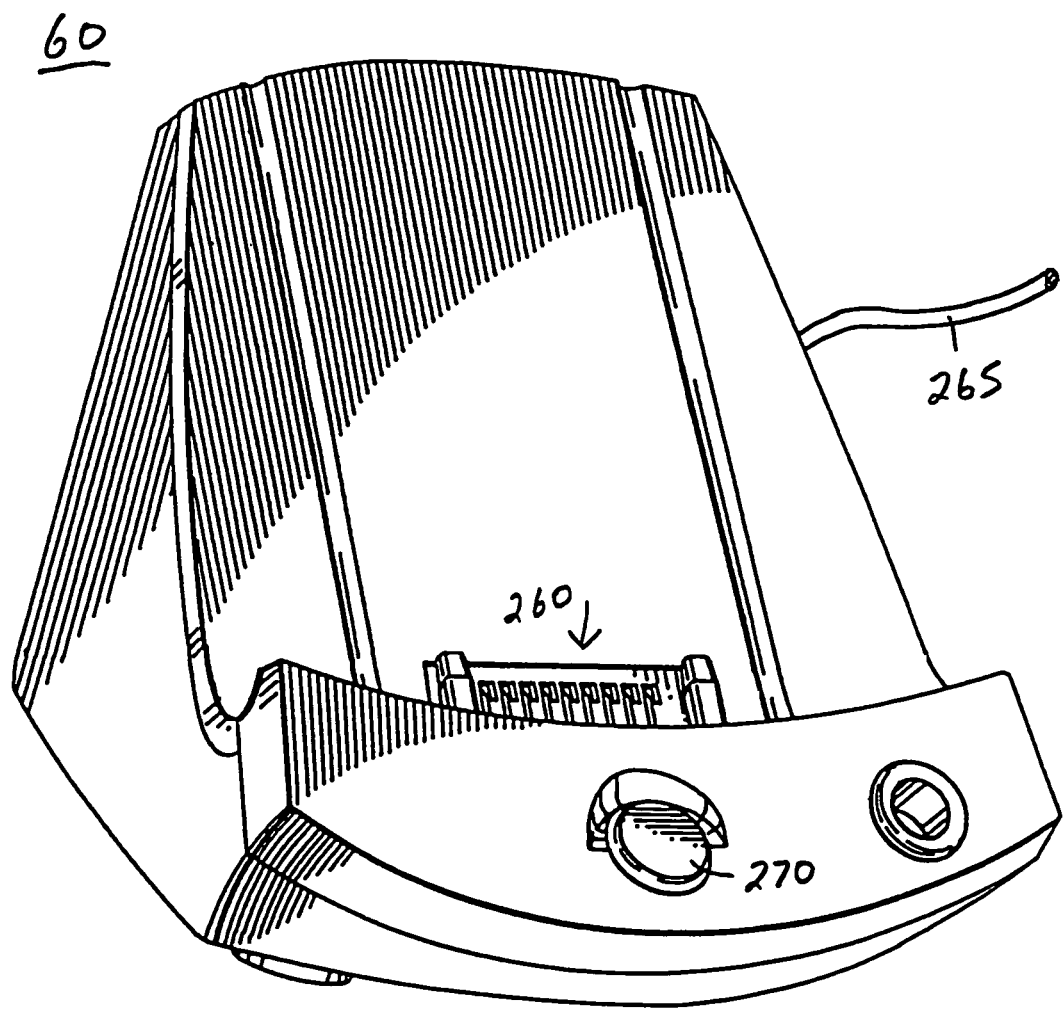
FIG. 5 is a perspective view of the cradle device for connecting the PDA computer system to other systems via a communication interface.

FIG. 5 is a perspective illustration of one embodiment of the cradle 60 for receiving the palmtop computer system 100. Cradle 60 contains a mechanical and electrical interface 260 for interfacing with communication interface 108 (FIG. 3B) of computer system 100 when system 100 is slid into the cradle 60 in an upright position. Once inserted, button 270 can be pressed to initiate two way communication between system 100 and other computer systems coupled to electrical interface cable 265.

Figure 6:
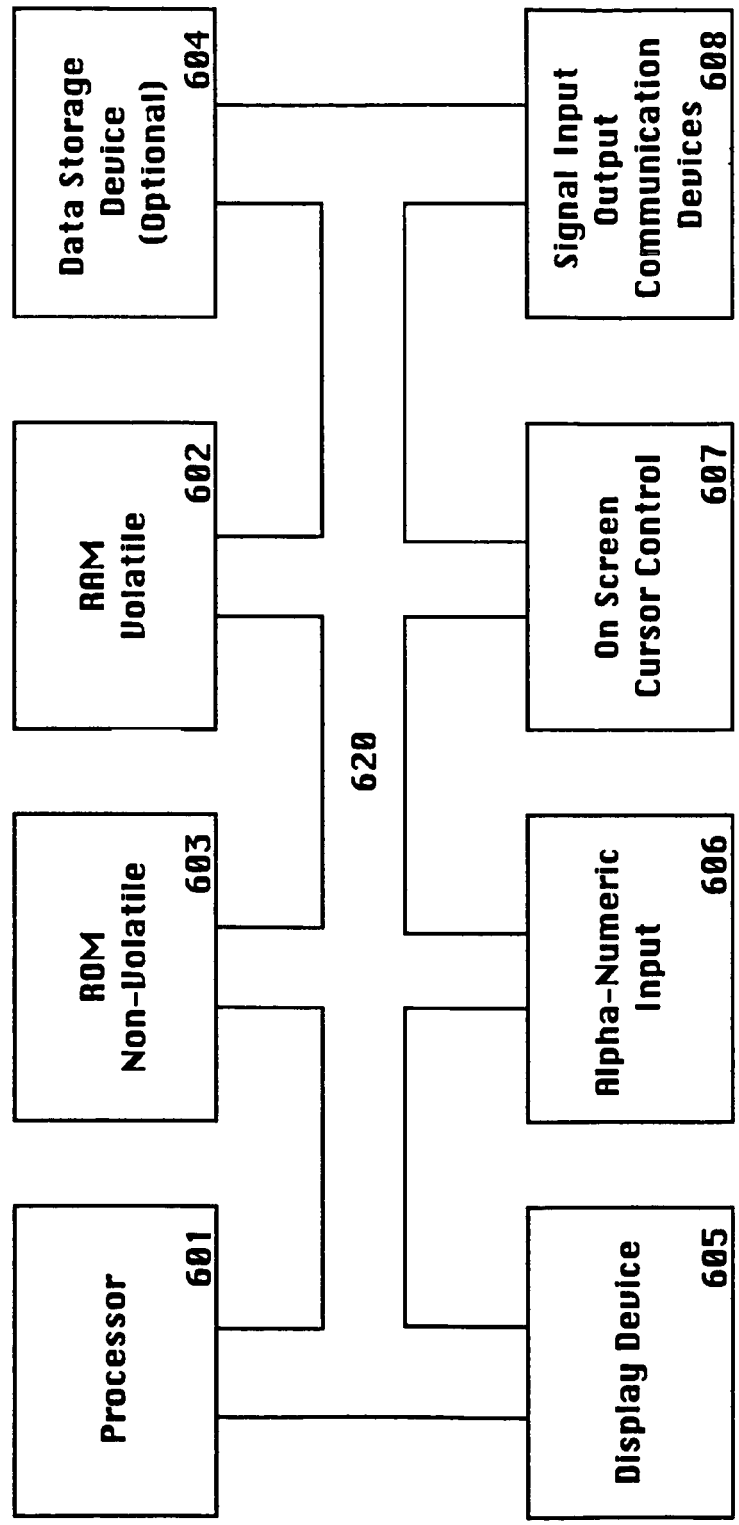
FIG. 6 is a logical block diagram of the PDA computer system in accordance with an embodiment of the present invention.

Referring now to FIG. 6, portions of the present electronic system are comprised of computer-readable and computer-executable instructions which reside, for example, in computer-readable media of an electronic system (e.g., personal digital assistant, computer system, and the like). FIG. 6 is a block diagram of exemplary interior components of an exemplary personal digital assistant 100 upon which embodiments of the present invention may be implemented. It is appreciated that the exemplary PDA 100 of FIG. 6 is only exemplary and that the present invention can operate within a number of different electronic systems including general purpose networked computer systems, embedded computer systems, and stand alone electronic systems such as a cellular telephone or a pager.

FIG. 6 illustrates circuitry of an exemplary electronic system or computer system 100 (such as the personal digital assistant 100), some of which can be implemented on PC board 225 (FIG. 4). Exemplary computer system 100 includes an address/data bus 620 for communicating information, a central processor 601 coupled with the bus 620 for processing information and instructions, a volatile memory 602 (e.g., random access memory (RAM), static RAM dynamic RAM, etc.) coupled with the bus 620 for storing information and instructions for the central processor 601 and a non-volatile memory 603 (e.g., read only memory (ROM), programmable ROM, flash memory, EPROM, EEPROM, etc.) coupled to the bus 620 for storing static information and instructions for the processor 601. Exemplary computer system 100 also includes an optional data storage device 604 (e.g., memory card, hard drive, etc.) coupled with the bus 620 for storing information and instructions. Data storage device 604 can be removable. As described above, exemplary computer system 100 also contains an electronic display device 605 coupled to the bus 620 for displaying information to the computer user. In one embodiment, PC board 225 (FIG. 4) can contain the processor 601, the bus 620, the ROM 603 and the RAM 602.

Also included in computer system 100 of FIG. 6 is an alphanumeric input device 606 which in one implementation is a handwriting recognition pad ("digitizer") having regions 106a and 106b (FIG. 3A), for instance. Device 606 can communicate information (spatial data and pressure data) and command selections to the central processor 601. System 100 also includes an optional cursor control or directing device 607 coupled to the bus for communicating user input information and command selections to the central processor 601. In one implementation, device 607 is a touch screen device incorporated with screen 605. Device 607 is capable of registering a position on the screen 605 where the stylus makes contact and the pressure of the contact. The display device 605 utilized with the computer system 100 may be a liquid crystal device, cathode ray tube (CRT), field emission device (FED, also called flat panel CRT) or other display device suitable for creating graphic images and alphanumeric characters recognizable to the user. In the preferred embodiment, display device 605 is a flat panel display.

With reference still to FIG. 6, exemplary computer system 100 also includes a signal input/output device 608 which is coupled to bus 620 for providing a communication link between computer system 100 and a network environment (e.g., network environment 50 and 51 of FIGS. 2A and 2B respectively). As such signal input/output device 608 enables central processor unit 601 to communicate wirelessly with other electronic systems coupled to the network. It should be appreciated that within the present embodiment, signal input/output device 608 is coupled to antenna 85 and provides the functionality to transmit and receive information over a wireless communication interface. It should be further appreciated that the present embodiment of signal input/output device 608 is well-suited to be implemented in a wide variety of ways. For example, signal input/output device 608 could be implemented as a modem. Further, signal input/output communication device 608, also coupled to bus 620, can be a serial port for communicating with the cradle 60. Additionally, device 608 can also include an infrared communication port.

Single-Step User Generated Notes on a Personal Digital Assistant

Although the description of the present invention will focus on an exemplary personal digital assistant (hereinafter referred to as "PDA") or palmtop computer system, the present invention can be practiced with other electronic systems or electronic devices (e.g. personal computer systems, cellular phones, pagers, portable web devices, etc.).

Figure 7:
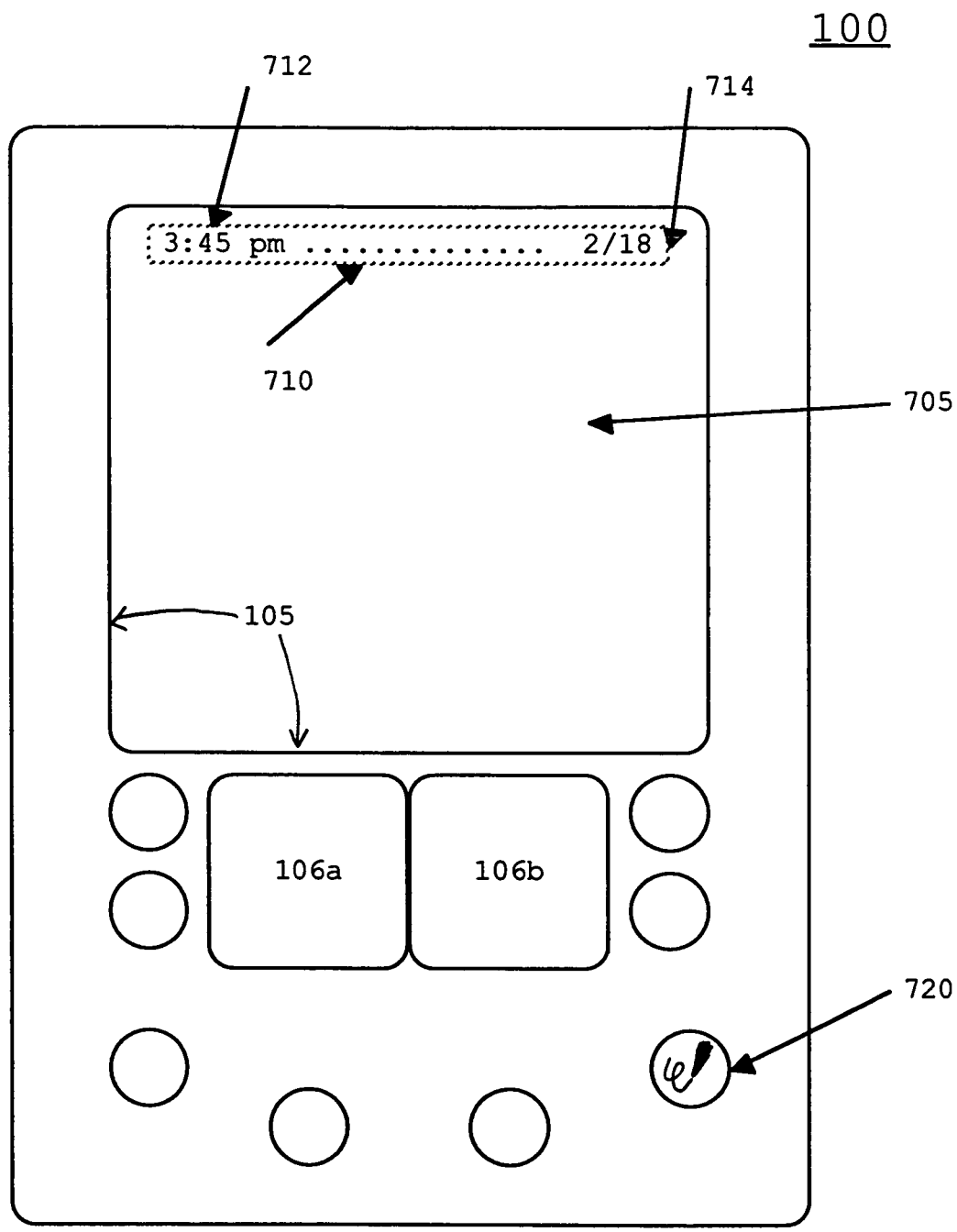
FIG. 7 is a front view of a PDA computer system illustrating the display screen, digitizer regions, and an exemplary notepad screen that is clear in the display screen.

With reference now to FIG. 7, PDA 100 is an excellent tool for writing down notes in display screen 105. In essence, the PDA 100 acts like a paper based notepad, except the PDA 100 uses a digitally based notepad. A software application that is a note taking application, sometimes referred to as notepad application, facilitates capturing and storing the digitally based notepad entry in the memory of PDA 100. The notepad application is selected or accessed in one step with the touch of hard button 720 and presents a cleared or blank window on display screen 105 that is ready for writing a handwritten note, in one embodiment of the present invention. It is important to note that the notepad application can be selected through various means including tapping an icon on a menu of a PDA.

The notepad application can be accessed at any time: when PDA 100 is on or off, or when PDA 100 is currently running another application. This integration of hardware and software within PDA 100 drastically reduces the number of steps down to one for accessing a window that is ready for note taking, thereby making note taking with a PDA 100 much more efficient.

Continuing with FIG. 7, a front view of PDA 100 illustrates an exemplary notepad entry 705 in its initial state, a cleared window in the display screen 105. The cleared window is ready for note taking. The display screen 105 in conjunction with the cleared window is a touch screen able to register contact in the form of "digital ink" between the screen and the tip of the stylus 80 (see FIG. 3A). With just one push of button 720, the notepad entry 705 in its initial blank state is displayed and ready for note taking.

Additionally, in FIG. 7, the notepad application automatically displays a title with the notepad entry 705, in another embodiment of the present invention. The title 710 initially is defaulted to a time and date stamp. The time portion 712 of the default title shows 3:45 p.m. and the date portion 714 shows the 18$^{th}$ of February. This title area 710 is simultaneously displayed with the notepad entry 705. Previous to the present invention, note taking applications did not simultaneously display a title with its associated note.

Figure 8:
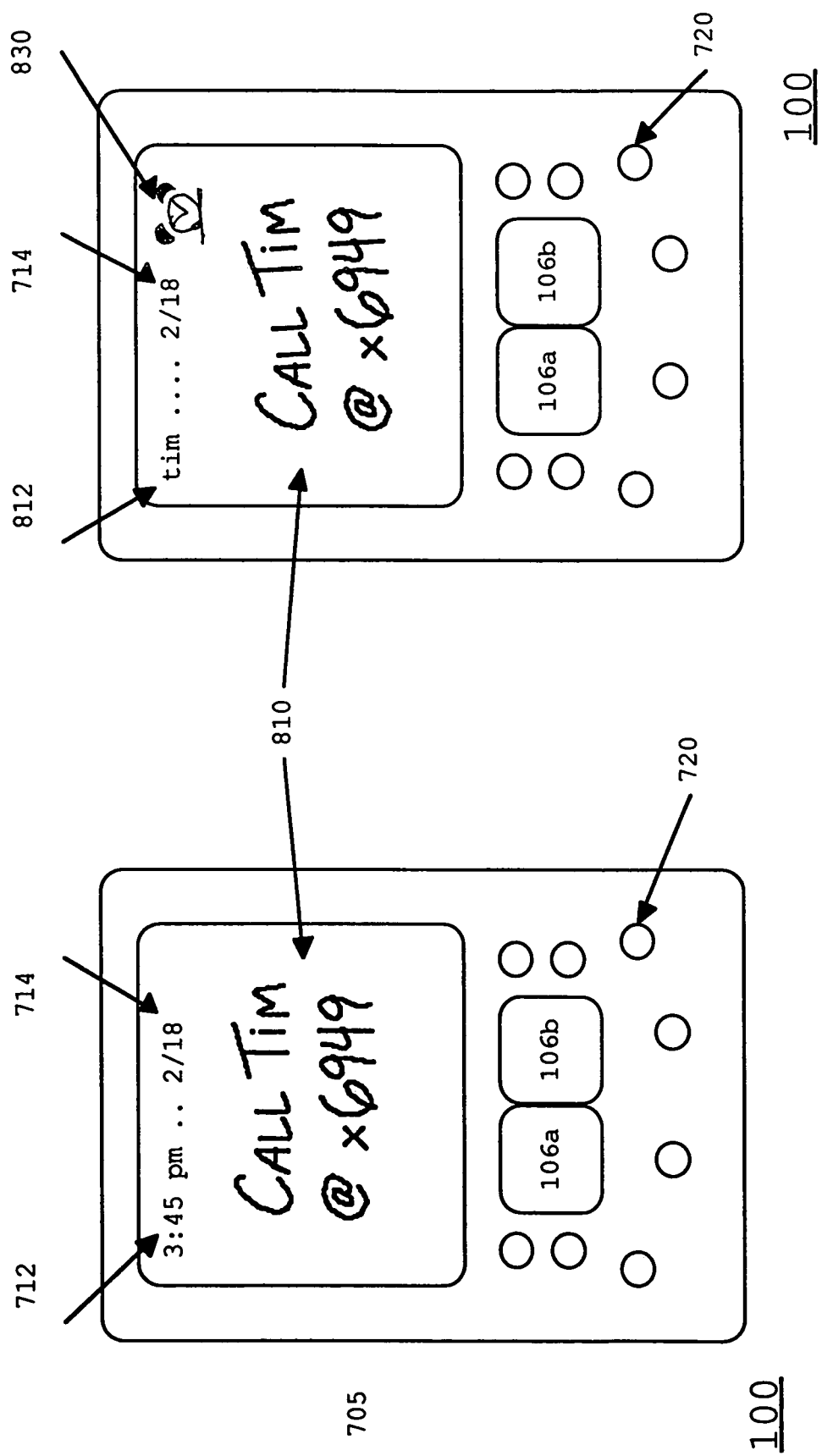
FIG. 8A is a front view of a PDA computer system illustrating the display screen, digitizer regions, and an exemplary notepad entry.
FIG. 8B is a front view of a PDA computer system illustrating the display screen, digitizer regions, an exemplary notepad entry, and a modified title.

FIG. 8A illustrates notepad entry 705 with a note 810 written in digital ink, in one embodiment of the present invention. The note 810 contains information referencing a name and a phone number. It is envisioned that notepad entry 705 can also contain notes 810 that are drawings, doodles, scribbles and the like. The title 710 remains defaulted to the time portion 712 and date portion 714 and is simultaneously displayed with the note 810 in the same display screen 105.

FIG. 8B illustrates how title 710 can be modified by the notepad application, in another embodiment of the present invention. Modification of title 710 occurs while title 710 is displayed simultaneously with note 810 in the same display screen 105. In this embodiment, the modification of the title occurs simultaneously while the note 810 is displayed and without opening a separate title screen.

The Regions 106a and 106b facilitate the modification of title 710 through alphanumeric symbol recognition. The title 710 has been changed to read "tim" 812 along with the date portion 714. It is envisioned that the modified title could easily have contained other letters, numbers, or any combination thereof, including retaining any portion of the default version of the title 710. In still another embodiment of the present invention, the date portion 714 remains with notepad entry 705 and cannot be modified.

Referring back to FIG. 8B, in another embodiment of the present invention, the notepad application allows a user to attach an alarm to the notepad entry 705. An alarm symbol 830 signifies that an alarm is attached to the notepad entry 705. The alarm is associated with a particular date and time with relation to an internal clock (not shown) located in PAD 100. At that particular date and time, the alarm will be triggered in the PDA. In one embodiment, the alarm is an audible alarm; however, the alarm can consist of mechanical alarms such as vibrating alarms, or other alarms such as the need arises.

Figure 9:
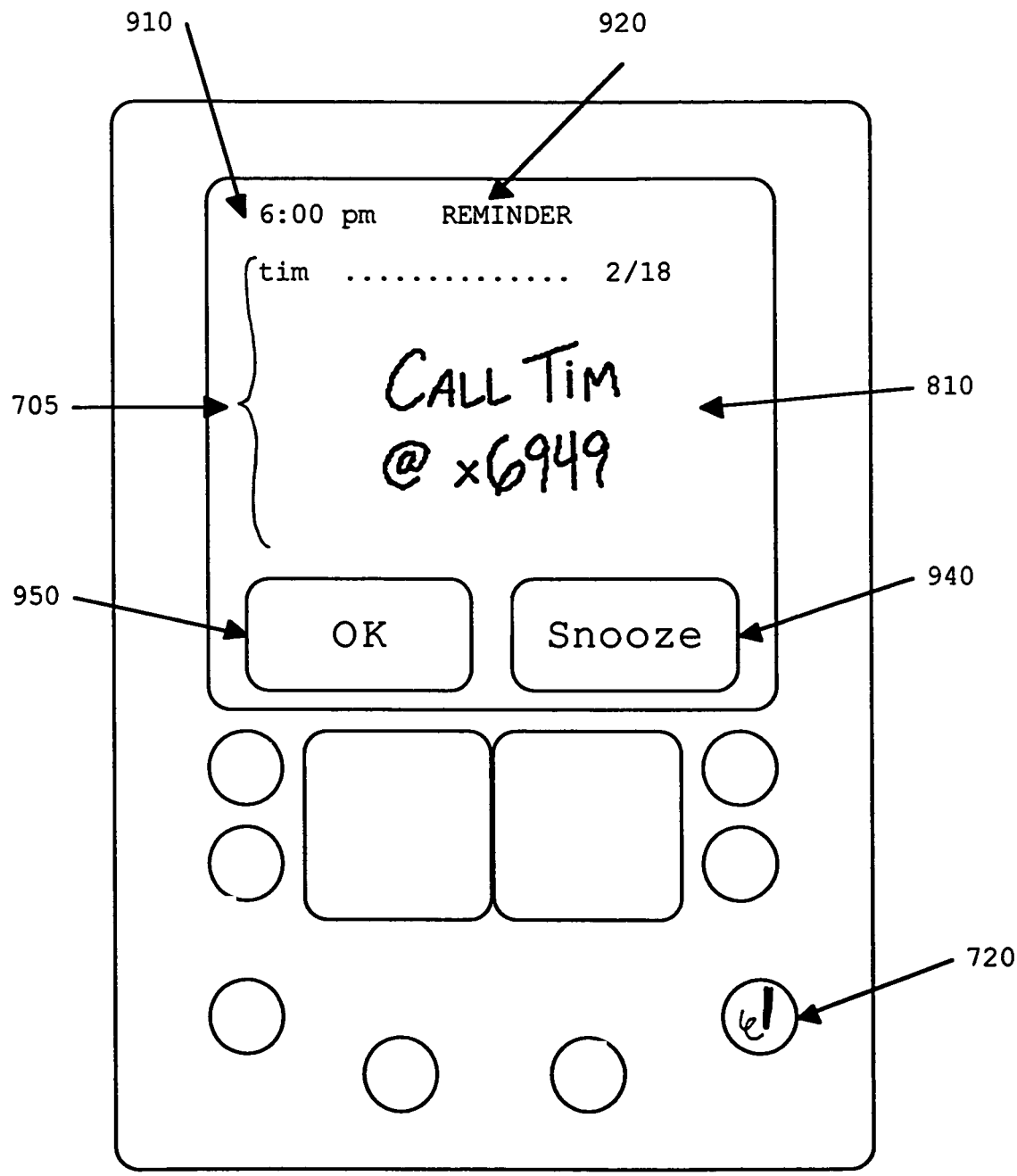
FIG. 9 is a front view of a PDA computer system illustrating the display screen, digitizer regions, and an exemplary notepad entry displayed concurrently with a triggered alarm.

In still another embodiment of the present invention, FIG. 9 illustrates a front view of a PDA 100 after an alarm is triggered. The notepad entry 705 has an assigned alarm that is associated with a particular date and time relative to the PDA 100. A user provides the alarm information that assigns the alarm to the notepad entry 705. In FIG. 9, the notepad entry 705 is automatically displayed on display screen 105 concurrently with the triggered alarm at that particular date and time. Automatically displaying the note concurrently with an alarm helps to quickly associate the alarm with an attached note. The PDA 100 becomes a virtual and portable sticky note that can alert a user to a task immediately without having the user turn on the PDA 100 and search for the attached note.

Continuing with reference to FIG. 9, the time 910 of the alarm (6:00 p.m.) is shown in one embodiment of the present invention. The screen title 920 with the word "REMINDER" tells the user that this note is attached to the presently triggered alarm. The "Snooze" toggle 940 when engaged by the user resets the alarm for a predetermined period of time, e.g., 5 minutes. At the end of the predetermined period of time, the alarm will re-trigger and the notepad entry 705 along with the display featured in FIG. 9 will again appear. The "OK" toggle 950, when engaged by the user, ends the alarm.

Figure 10:
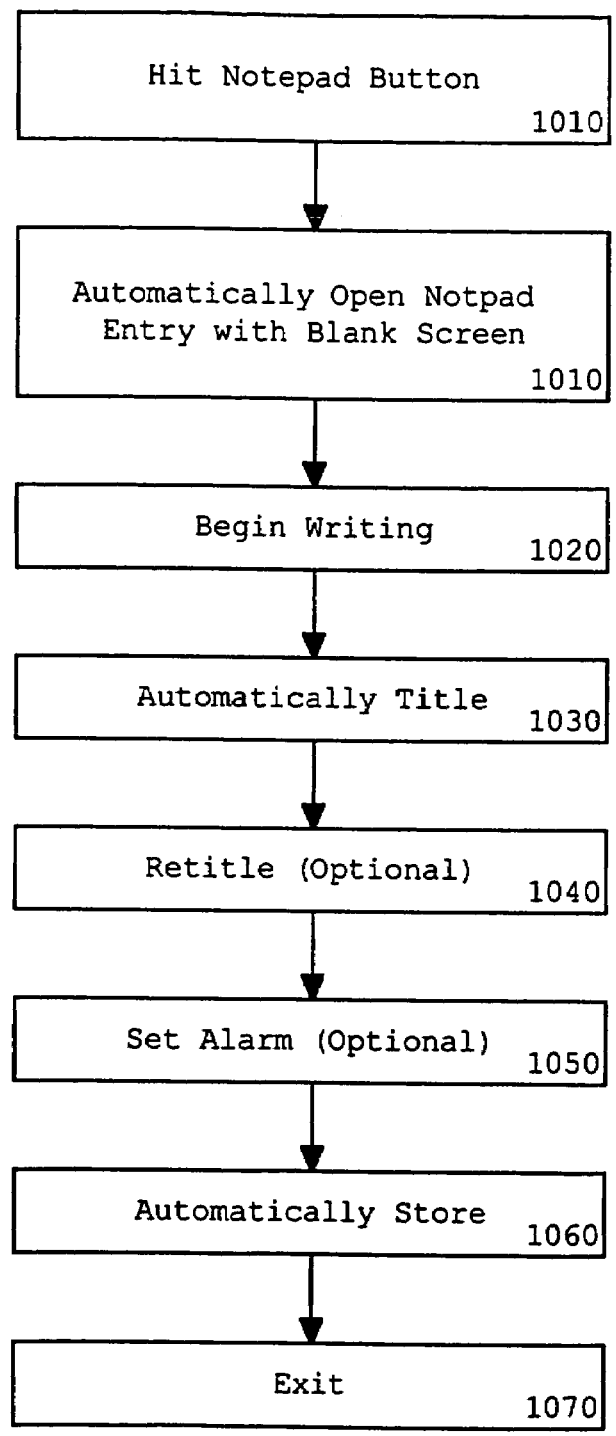
FIG. 10 is a flow diagram illustrating steps in a computer implemented method for single step access to user generated notes on a PDA computer system in accordance with one embodiment of the present invention.

FIG. 10 illustrates a flow diagram illustrating steps in a process 1000 for single-step access to user generated notes via a note taking application, such as a notepad application, on a PDA computer system in accordance with one embodiment of the present invention. In step 1010, the PDA receives information that a selector has been selected by a user. In the present embodiment, the user engages a hard button located on PDA 100 that is associated with the notepad application to select. It is important to note that in other embodiments, selection can be achieved through various means such as hitting an electronic button or icon on the display screen 105. Once the hard button is manually engaged, the notepad application automatically opens in step 1010. Then, a new notepad entry with a blank window is displayed in display screen 105 of PDA 100, in step 1015. The notepad entry is ready for note taking. A user can begin writing a note in the user's own handwriting in step 1020.

Continuing with process 1000, in step 1030, the notepad entry is automatically titled in another embodiment of the present invention. The default title contains a time and date stamp and is simultaneously displayed with the notepad entry. In step 1040, the user has the option of modifying the title. The title can be modified with alphanumeric inputs using a digitizer region that translates handwritten symbols into alphabet characters and numbers, such as regions 106a and 106b in FIG. 3A. The modified title can incorporate parts of the date and time stamp, or can be completed retitled. In another embodiment of the present invention, the date stamp always remains within the title and cannot be modified.

In step 1050 of process 1000, an alarm can be optionally assigned to the notepad entry in another embodiment of the present invention. The PDA 100 receives alarm information that is provided by a user, where the alarm information corresponds to the notepad entry and the alarm. The alarm is associated with a particular date and time with relation to the internal clock located in PDA 100. At that particular date and time, the alarm will be triggered in the PDA 100. Additionally, when the alarm is triggered, the notepad entry is concurrently displayed on the display screen 105 to facilitate the association between the alarm and the note.

In step 1060, the notepad entry is automatically stored in the memory of PDA 100, in one embodiment of the present invention. Each time the notepad application is exited or closed, the notepad entry is automatically stored. For example, the user may manually exit the notepad application, or the user may directly open another application, or the user may go to the application launcher without manually exiting the notepad application, or the user may leave the PDA 100 with the notepad entry displayed and let the PDA 100 automatically time itself out. Once stored, the notepad entry cannot be accidentally or indiscriminately modified since that notepad entry is only accessed by request. Only then can the note be edited. Thus, the next time the notepad application is actively opened a new notepad entry is displayed, not the previous notepad entry. This helps to maintain the integrity of the notepad entries.

Figure 11:
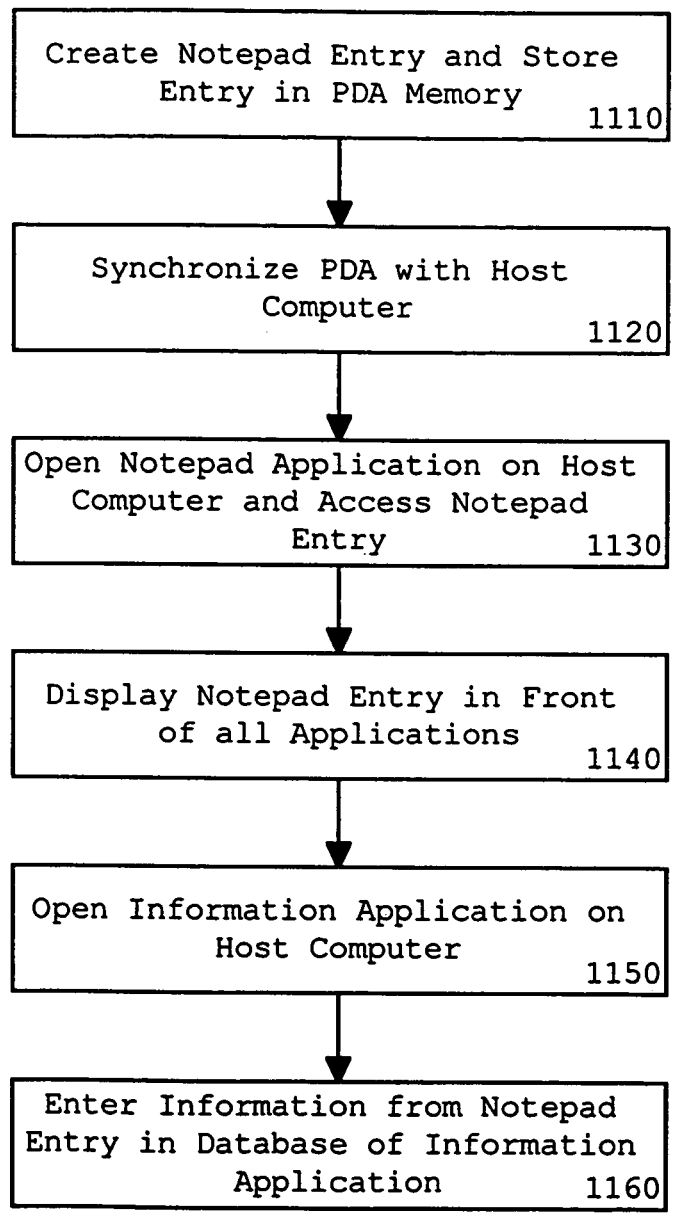
FIG. 11 is a flow diagram illustrating steps in a computer implemented method for transporting notepad information from a PDA computer system to a host computer system.

FIG. 11 is a flow diagram illustrating steps in a process 1100 for transporting information from a notepad entry on a PDA computer system to a host computer system, in one embodiment of the present invention. In step 1110, a notepad entry is created and stored in PDA 100. The notepad entry may contain information such as a telephone number as illustrated in notepad entry 705 of FIG. 9. In step 1120, the PDA 100 is synchronized with a host computer system, such as host computer system 56 in FIG. 2B, in order to update the notepad applications and the information contained within these notepad application.

Continuing with process 1100 of FIG. 11, in step 1130, the notepad application resident on the host computer is opened and the notepad entry is accessed. The notepad application has the capability to display the notepad entry in front of all applications running simultaneously on the host computer in step 1140. In this manner, information from the notepad entry 810 can be easily seen while that information is being transcribed to databases in other applications. Then, an information application is opened on the host computer in step 1150. This information application may be directed to personal information such as a datebook, address book, or the like. In step 1160, the information from the notepad entry 810 is entered into the database of the information application.

Figure 12:
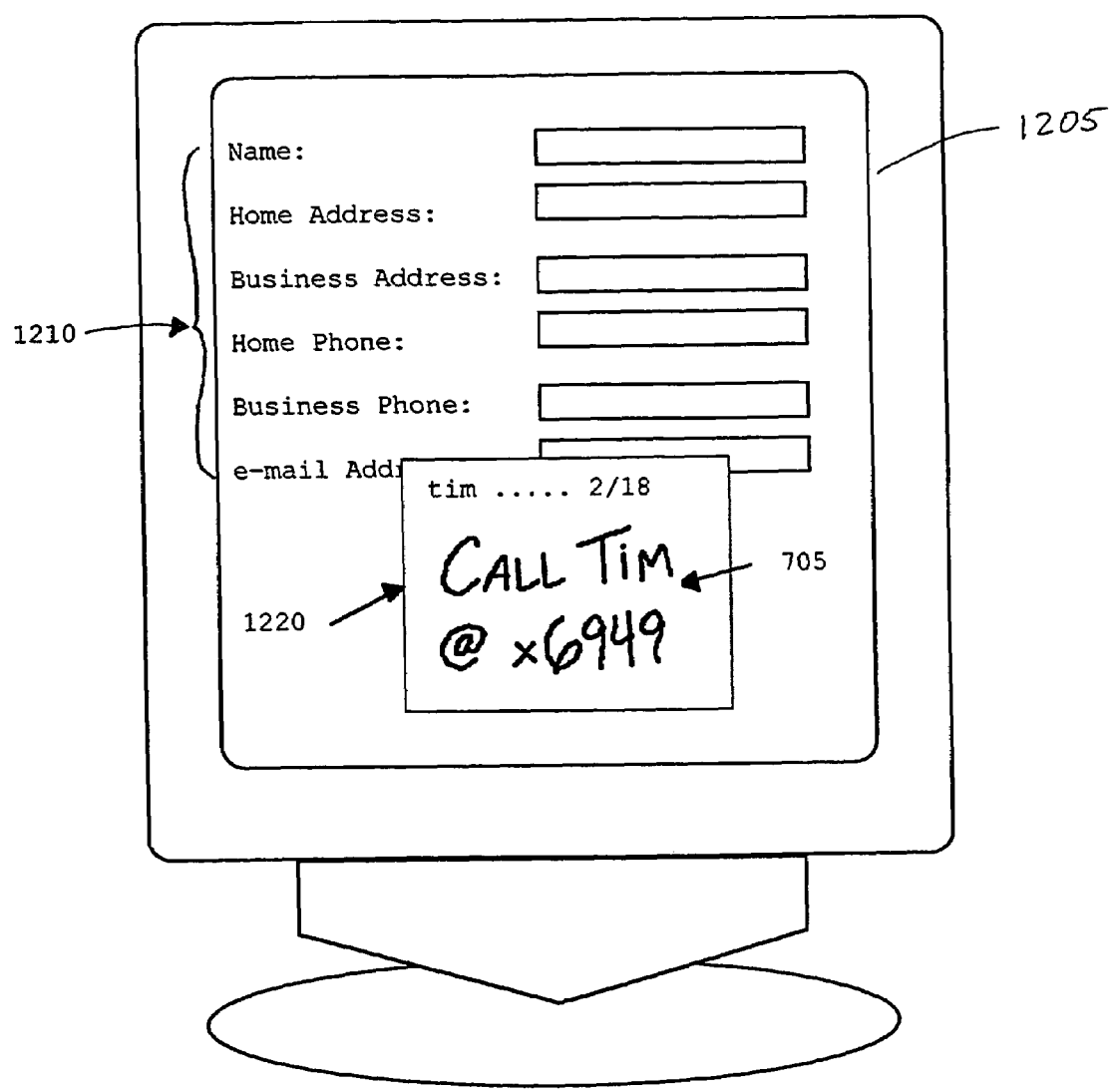
FIG. 12 is a front view of a display screen on a computer system illustrating an exemplary notepad entry that is displayed concurrently with a second personal information application.

FIG. 12 is a front view of a display screen 1205 on a host computer system, such as host computer system 56 in FIG. 2B, illustrating an exemplary notepad entry 705 that is displayed concurrently with a second personal information application, in one embodiment of the present invention. As discussed previously, the notepad entry 705 is displayed in front of all applications running simultaneously on the host computer. Notepad entry 705 could be displayed in an "always in front" box 1220. For example, the information contained within notepad entry 705 is, a telephone number for Tim. An appropriate personal information application to transfer the telephone number to is an address book application. Once the address book application is opened and a "new" entry is requested, the information fields 1210 are displayed behind the notepad entry 705 and are fully accessible. The fields 1210 may contain information such as name, address, phone numbers, e-mail addresses, etc. Thereafter, the information in notepad entry 705 can be easily transcribed into the database of the personal information application.

While the methods of embodiments illustrated in processes 1000 and 1100 show specific sequences and quantity of steps, the present invention is suitable to alternative embodiments. For example, not all the steps provided for in the methods are required for the present invention. Furthermore, additional steps can be added to the steps presented in the present embodiments. Likewise, the sequences of steps can be modified depending upon the application.

The instructions for the steps, and the data input and output from the steps of processes 1000 and 1100 may be implemented utilizing processor 601 and ROM memory 603 and RAM memory 602, as shown in FIG. 6. Furthermore, other types of memory storage can be utilized to accomplish the aforementioned such as a hard drive, a CD ROM, flash memory, or any compact integrated circuit memory storage device.

The preferred embodiment of the present invention, a method and system for single step access to user generated notes on a handheld electronic device, is thus described. While the present invention has been described in particular embodiments, it should be appreciated that the present invention should not be construed as limited by such embodiments, but rather construed according to the below claims.

What is claimed is:

1. A method of processing information, said method comprising:
responsive to a single user interaction associated with a note taking application, wherein the single user interaction is performed on a portable electronic device after the portable electronic device has been turned on, invoking said note taking application on the portable electronic device, wherein said invoking further comprises allocating a region of a display device of said portable electronic device operable to accept an electronic note comprising input of a user, wherein said invoking further comprises displaying an image corresponding to a new electronic note entry for accepting said electronic note;
automatically displaying a title with said electronic note on said display device of said portable electronic device simultaneously with said electronic note, wherein said title is automatically generated by said note taking application, said title includes a time and date stamp and said title is user-modifiable while being simultaneously displayed with said electronic note; and
responsive to a request to synchronize data between said portable electronic device and a computer system, automatically transferring said electronic note from said portable electronic device to said computer system.

2. The method of claim 1, wherein said single user interaction comprises a user interaction with a user interface component selected from a group consisting of a soft button and a physical key.

3. The method of claim 1, wherein said single user interaction comprises a user interaction with a user interface component dedicated to invoking only said electronic note taking application.

4. The method of claim 1, wherein said input of a user includes handwriting, the method further comprising:
digitizing said handwriting, wherein said digitizing further comprises automatically recognizing at least one character associated with said handwriting.

5. The method of claim 1, wherein said electronic note comprises at least one character selected from a group consisting of a letter and a number.

6. The method of claim 1, wherein said title comprises a date and time associated with said electronic note.

7. The method of claim 1, further comprising:
associating user-defined alarm information with said electronic note; and
automatically displaying said electronic note at a time associated with said user defined alarm information.

8. A portable electronic device comprising:
a housing;
a display device coupled to said housing;
a user interface component coupled with said housing;
a memory disposed within said housing; and
a processor disposed within said housing, wherein said processor is operable to execute instructions stored within said memory for implementing a method of processing information, said method comprising:
responsive to a single user interaction associated with a note taking application, wherein the single user interaction is performed on the portable electronic device after the portable electronic device has been turned on, invoking said note taking application, wherein said invoking further comprises allocating a region of said display device operable to accept an electronic note comprising input of a user, and wherein said invoking further comprises displaying an image corresponding to a new electronic note entry for accepting said electronic note;

automatically displaying a title with said electronic note on said display device of said portable electronic device simultaneously with said electronic note, wherein said title is automatically generated by said note taking application, said title includes a time and date stamp and said title is user-modifiable while being simultaneously displayed with said electronic note; and responsive to a request to synchronize data between said portable electronic device and a computer system, automatically transferring said electronic note from said portable electronic device to said computer system.

9. The portable electronic device of claim 8, wherein said user interface component is selected from a group consisting of a soft button and a physical key.

10. The portable electronic device of claim 8, wherein said user interface component is dedicated to invoking only said electronic note taking application.

11. The portable electronic device of claim 8, wherein said input of the user includes handwriting, said method further comprising:

digitizing said handwriting, wherein said digitizing further comprises automatically recognizing at least one character associated with said handwriting.

12. The portable electronic device of claim 8, wherein said electronic note comprises at least one character selected from a group consisting of a letter and a number.

13. The portable electronic device of claim 8, wherein said title comprises a date and time associated with said electronic note.

14. The portable electronic device of claim 8, wherein said method further comprises:

associating user-defined alarm information with said electronic note; and automatically displaying said electronic note at a time associated with said user-defined alarm information.

15. A portable electronic device comprising:

a housing;

a user interface component coupled with said housing;

a memory disposed within said housing and comprising an electronic note taking application;

a display device coupled to said housing; and a processor disposed within said housing, wherein said processor is operable to invoke said electronic note taking application in response to a single user interaction with a displayed icon associated with a note taking application, wherein the single user interaction is performed after the portable electronic device has been turned on, said displayed icon is available for selection while a different application is running, wherein said processor is further operable to allocate a region of said display device operable to accept an electronic note comprising input of a user and to display an image corresponding to a new electronic note entry for accepting said electronic note, wherein said processor is further operable to automatically display a title with said electronic note on said display device simultaneously with said electronic note, wherein said title is automatically generated by said note taking application, said title includes a time and date stamp and said title is user-modifiable while being simultaneously displayed with said electronic note; and wherein said processor is further operable to initiate a transfer said electronic note to a computer system responsive to a request to synchronize data between said portable electronic device and a computer system, and wherein said processor is further operable to automatically store said electronic note in said memory in response to a close command.

16. The portable electronic device of claim 15, wherein said user interface component is dedicated to invoking only said electronic note taking application.

17. The portable electronic device of claim 15, wherein said input of the user includes handwriting, the portable electronic device further comprising:

a digitizer overlapping said region of said display device, wherein said digitizer is operable to enable automatic recognition of at least one character associated with said handwriting.

18. The portable electronic device of claim 15, wherein said electronic note comprises at least one character selected from a group consisting of a letter and a number.

19. The portable electronic device of claim 15, wherein said title comprises a date and time associated with said electronic note.

20. The portable electronic device of claim 15, wherein said processor is further operable to:

associate user-defined alarm information with said electronic note; and initiate an automatically display said electronic note at a time associated with said user-defined alarm information.

* * * * *